United States Patent
Mizusawa (10) Patent No.: US 8,369,355 B2
(45) Date of Patent: Feb. 5, 2013

(54) COMMUNICATION CONTROL DEVICE, COMMUNICATION CONTROL METHOD, PROGRAM AND COMMUNICATION SYSTEM

(75) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 12/691,138

(22) Filed: Jan. 21, 2010

(65) Prior Publication Data

US 2010/0189128 A1 Jul. 29, 2010

(30) Foreign Application Priority Data

Jan. 27, 2009 (JP) ................ P2009-015703

(51) Int. Cl.
*H04L 29/06* (2006.01)
*H04W 4/18* (2009.01)

(52) U.S. Cl. ............................ 370/466; 455/74.1
(58) Field of Classification Search .......... 370/466; 455/74.1
See application file for complete search history.

(56) References Cited

U.S. PATENT DOCUMENTS

| | | | | |
|---|---|---|---|---|
| 7,493,146 B1 * | 2/2009 | Delker et al. | ............ | 455/567 |
| 7,535,868 B2 * | 5/2009 | Black et al. | ............ | 370/329 |
| 7,565,115 B2 * | 7/2009 | Alexis | ............ | 455/74.1 |
| 7,991,427 B2 * | 8/2011 | Nath et al. | ............ | 455/552.1 |
| 2002/0193107 A1 | 12/2002 | Nascimento, Jr. | | |
| 2004/0097198 A1 * | 5/2004 | Chen | ............ | 455/74.1 |
| 2006/0111151 A1 * | 5/2006 | Lie et al. | ............ | 455/565 |
| 2007/0183449 A1 | 8/2007 | Beagley et al. | | |
| 2008/0070565 A1 | 3/2008 | Maeda | | |

FOREIGN PATENT DOCUMENTS

| | | |
|---|---|---|
| EP | 1 322 089 A2 | 6/2003 |
| EP | 2 001 194 A2 | 12/2008 |
| JP | 2001-128246 | 5/2001 |
| JP | 2005-223586 | 8/2005 |
| JP | 2006/054341 | 5/2006 |

OTHER PUBLICATIONS

European Search Report mailed Jul. 6, 2010, in EP 10 15 1745.

* cited by examiner

*Primary Examiner* — Melvin Marcelo
(74) *Attorney, Agent, or Firm* — Finnegan, Henderson, Farabow, Garrett & Dunner LLP (57) ABSTRACT

There is provided a communication control device comprising: a wired connection unit that makes a wired connection with a mobile terminal; a setting unit that sets a frequency of a communication signal transmitted to or received from the mobile terminal through the wired connection unit; and a protocol conversion unit capable of converting a protocol of the communication signal from a mobile communication protocol to an IP (Internet Protocol).

20 Claims, 4 Drawing Sheets

COMMUNICATION CONTROL DEVICE, COMMUNICATION CONTROL METHOD, PROGRAM AND COMMUNICATION SYSTEM

BACKGROUND OF THE INVENTION

1. Field of the Invention

The present invention relates to a communication control device, a communication control method, a program and a communication system.

2. Description of the Related Art

Communication means by which a high communication speed can be obtained are available for general users today, like the proliferation of the 3rd generation cellular phone terminals. Accordingly, massive contents such as music, games or videos are widely distributed on cellular phone networks. A communication scheme used for cellular phone networks would continue to become more and more sophisticated, and the amount of data transmitted and received on cellular phone networks is projected to increase continuously. Further, installation of additional base stations and expansion of a communication service area are expected in order that users can use cellular phone terminals without restraint, even indoors where radio waves are difficult to reach, for example.

Meanwhile, high-speed broadband lines such as FTTH, ADSL or CATV are also widespread in ordinary households, and connection services that can be used with no time restriction at a flat rate, for example, are widely used. In view of such circumstances, introduction of an indoor small base station that enables a connection from a cellular phone terminal to a high-speed broadband line indoors, for example, is being studied. Advantages of introduction of indoor small base stations for cellular phone carriers are that a service area of cellular phones can be expanded to the indoors where radio waves are difficult to reach, a communication speed is expected to improve compared to the outdoors where radio resources are shared by a plurality of users, costs are low compared to installing additional outdoor base stations and so on. Further, cellular phone users can expect reduction of communication expenses as a result that the above merits for carriers are given to the users in addition to improvement of a communication speed at home.

However, in the case where an indoor small base station is additionally installed in an existing cellular phone service area established by a plurality of macro base stations, interference among radio channels is assumed to occur between an indoor small base station and an outdoor macro base station, between a user of an indoor small base station and a user of a macro base station, between a plurality of indoor small base stations and so on. This can adversely affect the quality of the existing cellular phone service. In order to avoid such an issue of interference, it is necessary for an indoor small base station to grasp the usage status of radio channels of nearby base stations and set a parameter such as a frequency of a radio channel or a transmitting power so as to avoid interference. Further, assuming that indoor small base stations will be popularized step by step in a metropolitan area where residences, office buildings and so on are densely packed, the above-described interference avoidance process should be performed dynamically. In light of this, Japanese Domestic Re-Publication No. 2006-54341, for example, proposes a technique of making inquiries about location information of nearby base stations and the setting status of radio channels to a server installed on a carrier network at the start or restart of an indoor small base station and setting a radio channel of the indoor small base station based on the acquired information.

SUMMARY OF THE INVENTION

However, by incorporating the interference avoidance function such as monitoring of the neighboring channel usage status or inquiry to a server into a device, for example, manufacturing costs of the device become higher, which hampers price reduction of indoor small base stations. This raises a concern that introduction of indoor small base stations to individual households would not make progress. Further, even with use of the interference avoidance function, there is a possibility that interference will not completely avoided.

In light of the foregoing, it is desirable to provide a novel and improved communication control device, communication control method, program and communication system that enable expansion of a communication service area to the indoors where radio waves are difficult to reach with no interference with communication by another base station or another terminal.

According to an embodiment of the present invention, there is provided a communication control device including: a wired connection unit that makes a wired connection with a mobile terminal; a setting unit that sets a frequency of a communication signal transmitted to or received from the mobile terminal through the wired connection unit; and a protocol conversion unit capable of converting a protocol of the communication signal from a mobile communication protocol to an IP (Internet Protocol).

The communication signal may be a signal being the same as a radio signal transmittable and receivable through an antenna by the mobile terminal.

The mobile terminal may be a cellular phone terminal.

The communication control device may further include a storage unit that stores a set value containing the frequency to be used for communication with the mobile terminal.

The communication control device may further include a control unit that transmits information related to an available frequency to a mobile terminal connected to the wired connection unit at regular intervals.

According to another embodiment of the present invention, there is provided a communication control method including the steps of: making a wired connection between a mobile terminal and a communication control device; setting a frequency of a communication signal transmitted to or received from the mobile terminal in the communication control device; converting a protocol of the communication signal received from the mobile terminal from a mobile communication protocol to an IP (Internet Protocol) in the communication control device; and sending out the communication signal converted into the IP to an IP network by the communication control device.

According to another embodiment of the present invention, there is provided a program causing a computer controlling a communication control device including a wired connection unit that makes a wired connection with a mobile terminal to implement functions including: a setting unit that sets a frequency of a communication signal transmitted to or received from the mobile terminal through the wired connection unit; and a protocol conversion unit capable of converting a protocol of the communication signal from a mobile communication protocol to an IP (Internet Protocol).

According to another embodiment of the present invention, there is provided a communication system including: a mobile terminal having a radio communication unit capable of transmitting and receiving a communication signal in compliance with a mobile communication protocol; and a communication control device having a wired connection unit that makes a wired connection with the mobile terminal, a setting unit that sets a frequency of the communication signal transmitted to or received from the mobile terminal through the wired connection unit, and a protocol conversion unit capable of converting a protocol of the communication signal from a mobile communication protocol to an IP (Internet Protocol).

According to the embodiments of the present invention described above, it is possible to provide a communication control device, a communication control method, a program and a communication system that enable expansion of a communication service area to the indoors where radio waves are difficult to reach with no interference with communication by another base station or another terminal.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Overview of Communication System according to Embodiment
2. Configuration of Device according to Embodiment
3. Flow of Communication Control Processing according to Embodiment
4. Summary <1. Overview of Communication System According to Embodiment>

Figure 1:
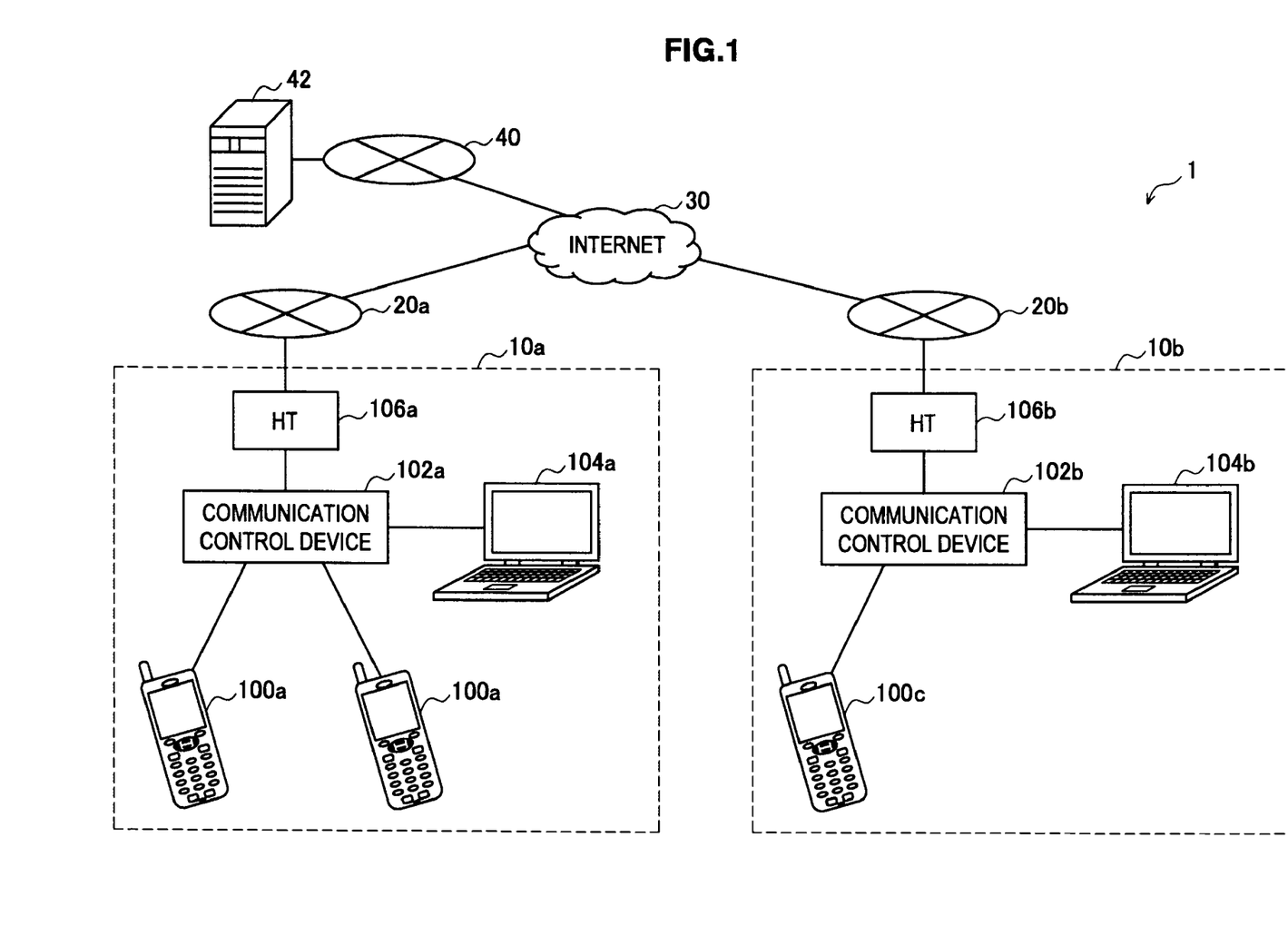
FIG. 1 is a schematic view showing an overview of a communication system according to an embodiment.

FIG. 1 is a schematic view showing an overview of a communication system 1 according to an embodiment of the present invention. Referring to FIG. 1, the communication system 1 includes home networks 10a and 10b, ISP networks 20a and 20b, the Internet 30, a core network 40 and a connection management server 42. The home network 10a includes cellular phone terminals 100a and 100b, a communication control device 102a, a setting terminal 104a and a home terminal 106a. The home network 10b includes a cellular phone terminal 100c, a communication control device 102b, a setting terminal 104b and a home terminal 106b.

The home networks 10a and 10b are small-scale networks respectively constructed indoors such as in a residence or office in most cases. Another given device which is not shown may be further connected to the home networks 10a and 10b.

Inside a building in which the home network 10a or 10b is constructed, radio waves from a base station (not shown) that provides a cellular phone service, for example, are difficult to reach in some cases. In such a case, the above-described indoor small base station is installed inside the building. Then, the installed indoor small base station receives and relays radio waves from each cellular phone terminal, so that indoor users can use the cellular phone service by using each cellular phone terminal. However, as described earlier, installation of the indoor small base station causes interference between radio channels, which adversely affects the quality of the existing cellular phone service. In view of this, in this embodiment, the communication control devices 102a and 102b are installed in the home networks 10a and 10b, respectively, instead of the indoor small base station as shown in FIG. 1.

The cellular phone terminals 100a, 100b and 100c are examples of mobile terminals that are used for communication by users in the communication system 1. Hereinafter, the cellular phone terminals 100a, 100b and 100c are referred to collectively as the cellular phone terminal 100 by omitting alphabets of their reference symbols when there is no particular need to distinguish among them. The same applies to the home network 10 (10a/10b), the ISP network 20 (20a/20b), the communication control device 102 (102a/102b), the setting terminal 104 (104a/104b) and the home terminal 106 (106a/106b). The cellular phone terminal 100 is connected to the communication control device 102 in a wired manner by using a coaxial cable or the like, for example, when performing communication according to the embodiment. A configuration of the cellular phone terminal 100 is described in detail later. It should be noted that mobile terminals used for communication by users in the communication system 1 are not limited to cellular phone terminals, and they may be any kind of terminal devices such as a PC (Personal Computer), PDA (Personal Digital Assistants), a game terminal or a home appliance.

The communication control device 102 relays communication signals between the cellular phone terminal 100 that is connected by a wire and an external network (e.g. the ISP network 20) that is connected through the home terminal 106. An IP (Internet Protocol) is typically used for communication between the communication control device 102 and the external network. A configuration of the communication control device 102 is described in detail later.

The setting terminal 104 is a terminal device for a user to set control data to be used for control of communication by the communication control device 102. The control data that can be set by the setting terminal 104 contains data such as frequency data, transmitting power data or a spreading code related to communication resources between the cellular phone terminal 100 and the communication control device 102, for example. Note that the setting terminal 104 does not necessarily exist in the home network 10. The control data may be set directly by the communication control device 102 through a user interface mounted to the communication control device 102. Further, the control data may be set by using the cellular phone terminal 100 through an alternative communication means (e.g. Bluetooth (registered trademark) or IrDA (Infrared Data Association) etc.) included in the cellular phone terminal 100, for example.

The home terminal 106 is a device that provides an interface between the home network 10 and the ISP network 20. The home terminal 106 may be an OLT (Optical Line Terminal), an ADSL modem, a CATV modem, a TA (Terminal Adapter) or the like. Note that the communication control device 102 and the home terminal 106 are not necessarily configured as physically separated devices.

The ISP (Internet Service Provider) network 20 is a network of an ISP that provides an Internet connection service to which a user subscribes. The ISP network 20 enables access to the Internet 30 from devices included in the home network 10.

The ISP network 20 and the core network 40 are connected to the Internet 30. Therefore, communication packets transmitted from the home network 10 through the ISP network 20 can reach the core network 40 via the Internet 30.

The core network 40 is a network for the cellular phone service provided by a cellular phone carrier. The core network 40 is connected to the Internet 30 by using a gateway device, which is not shown.

The connection management server 42 is a server that manages subscriber information, location information or the like of the cellular phone terminal 100 that makes connection to the cellular phone service. As described in further detail later, when the cellular phone terminal 100 communicates with another terminal device by using a cellular phone network, a location registration request is transmitted to the connection management server 42 from the cellular phone terminal 100 through the respective networks shown in FIG. 1. In response to the received location registration request, the connection management server 42 registers the location information or the like of the cellular phone terminal 100 onto a database.

The communication system 1 according to an embodiment of the present invention is described above with reference to FIG. 1. Hereinafter, specific configurations of the cellular phone terminal 100 and the communication control device 102 that achieve communication without interference with communication by another terminal or the like in the communication system 1 are described.

<2. Configuration of Device According to Embodiment>

[2-1. Cellular Phone Terminal]

Figure 2:
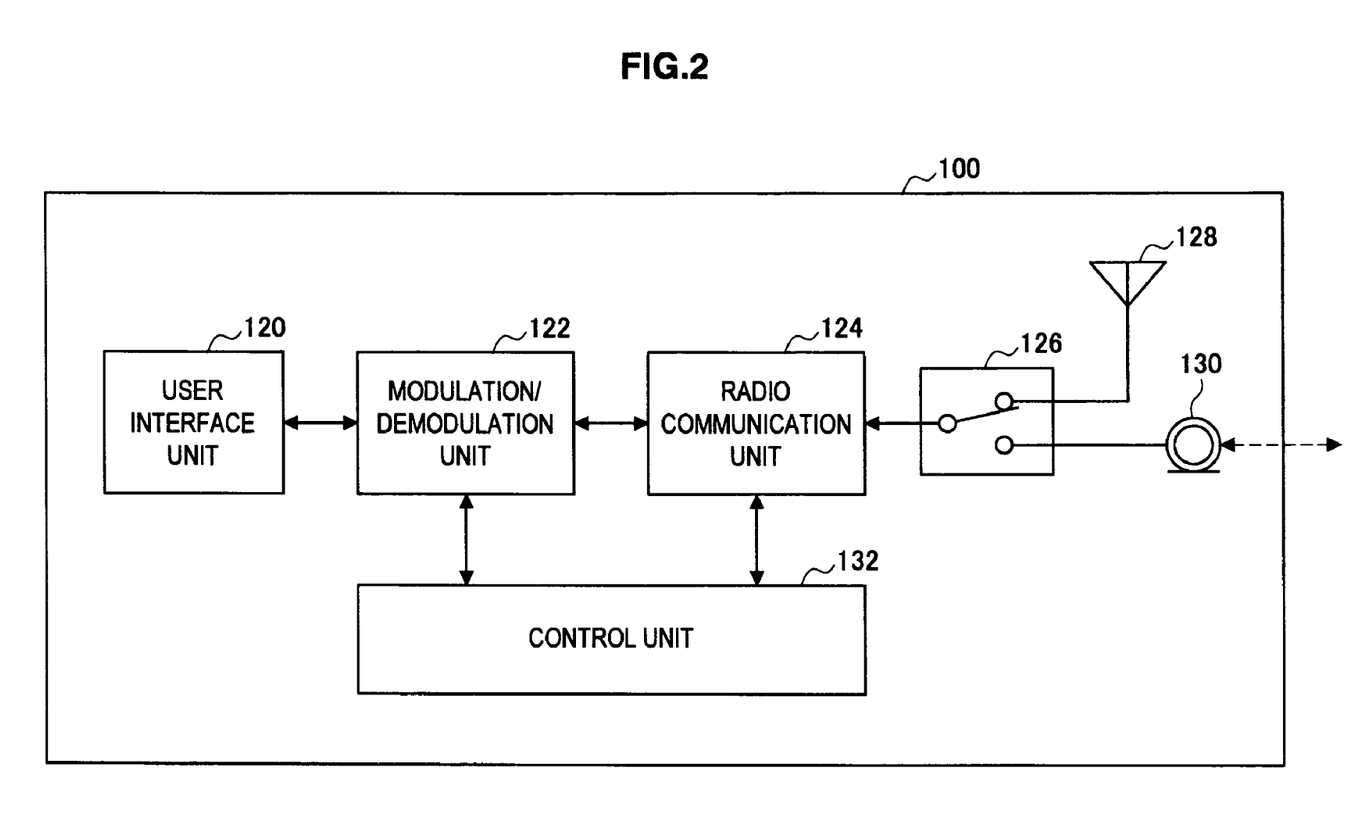
FIG. 2 is a block diagram showing a configuration of a cellular phone terminal according to an embodiment.

FIG. 2 is a block diagram showing an example of a configuration of the cellular phone terminal 100 according to an embodiment. Referring to FIG. 2, the cellular phone terminal 100 includes a user interface unit 120, a modulation/demodulation unit 122, a radio communication unit 124, a switch unit 126, an antenna 128, a wired connection unit 130 and a control unit 132.

The user interface unit 120 provides a user with an operating means (a button, a switch, a touch panel etc.) for operating the cellular phone terminal 100, a conversation means (a microphone, a speaker etc.) for making telephone conversation and a display means (a display etc.) for displaying information, for example. A voice of a user during telephone conversation, for example, is converted into an audio signal as an electrical signal in the user interface unit 120 and input to the modulation/demodulation unit 122. Further, an audio signal output from the modulation/demodulation unit 122, for example, is converted into a voice by the user interface unit 120 and output to a user. Furthermore, data generated by using the operating means of the user interface unit 120, for example, is output as a data signal to the modulation/demodulation unit 122.

The modulation/demodulation unit 122, for example, modulates an audio signal or a data signal input from the user interface unit 120 in compliance with a mobile communication protocol to be used for communication and thereby generates a communication signal. The communication signal generated by the modulation/demodulation unit 122 is output to the radio communication unit 124. Further, the modulation/demodulation unit 122, for example, demodulates a communication signal received by the radio communication unit 124 in compliance with the mobile communication protocol and outputs it as an audio signal or a data signal to the user interface unit 120. It should be noted that the case where a mobile communication protocol used by the cellular phone terminal 100 is W-CDMA (Wideband-Code Division Multiple Access) is principally described in this specification. However, a mobile communication protocol is not limited to W-CDMA in this embodiment, and it may be any protocol such as GSM (Global System for Mobile communications), PDC (Personal Digital Cellular) or PHS (Personal Handyphone System).

The radio communication unit 124, for example, converts a frequency of a communication signal input from the modulation/demodulation unit 122 into a specified transmitting frequency and outputs it to the switch unit 126. Further, the radio communication unit 124, for example, amplifies a communication signal having a specified receiving frequency input from the switch unit 126, converts the frequency and outputs it to the modulation/demodulation unit 122. The radio communication unit 124 may be a general RF (Radio Frequency) circuit that implements a mobile communication protocol usable by the cellular phone terminal 100, for example. Note that the transmitting frequency and the receiving frequency used in the radio communication unit 124 are set in advance prior to the start of communication in response to a request from the communication control device 102, which is described later.

Typically, the switch unit 126 connects the radio communication unit 124 to the wired connection unit 130 when a cable is connected to the wired connection unit 130, which is described later. Meanwhile, the switch unit 126 connects the radio communication unit 124 to the antenna 128 when a cable is not connected to the wired connection unit 130. Note that the switch unit 126 may connect the radio communication unit 124 to the antenna 128 when a cable is connected to the wired connection unit 130 in response to a direction from a user, for example.

The antenna 128 transmits a communication signal output from the radio communication unit 124 through the switch unit 126 as a radio signal to a base station, for example. Further, the antenna 12 receives a radio signal transmitted from a base station, for example, and inputs it to the radio communication unit 124 through the switch unit 126.

The wired connection unit 130 has a connector to which a cable such as a coaxial cable, for example, can be inserted and is used to make a wired connection from the cellular phone terminal 100 to the communication control device 102. When a cable is connected to the wired connection unit 130, communication signals are transmitted and received through the cable between the radio communication unit 124 and the communication control device 102. The communication signals are substantially the same signals as radio signals that can be transmitted and received by the antenna 128 except that a communication medium through which the signals propagate is wired or wireless. Note that a cable connected to the wired connection unit 130 is not limited to a coaxial cable, and it may be any physical cable such as a twisted pair cable, for example.

The control unit 132 controls the above-described functions of the cellular phone terminal 100 as a whole by using a CPU (Central Processing Unit), for example.

[2-2. Communication Control Device]

Figure 3:
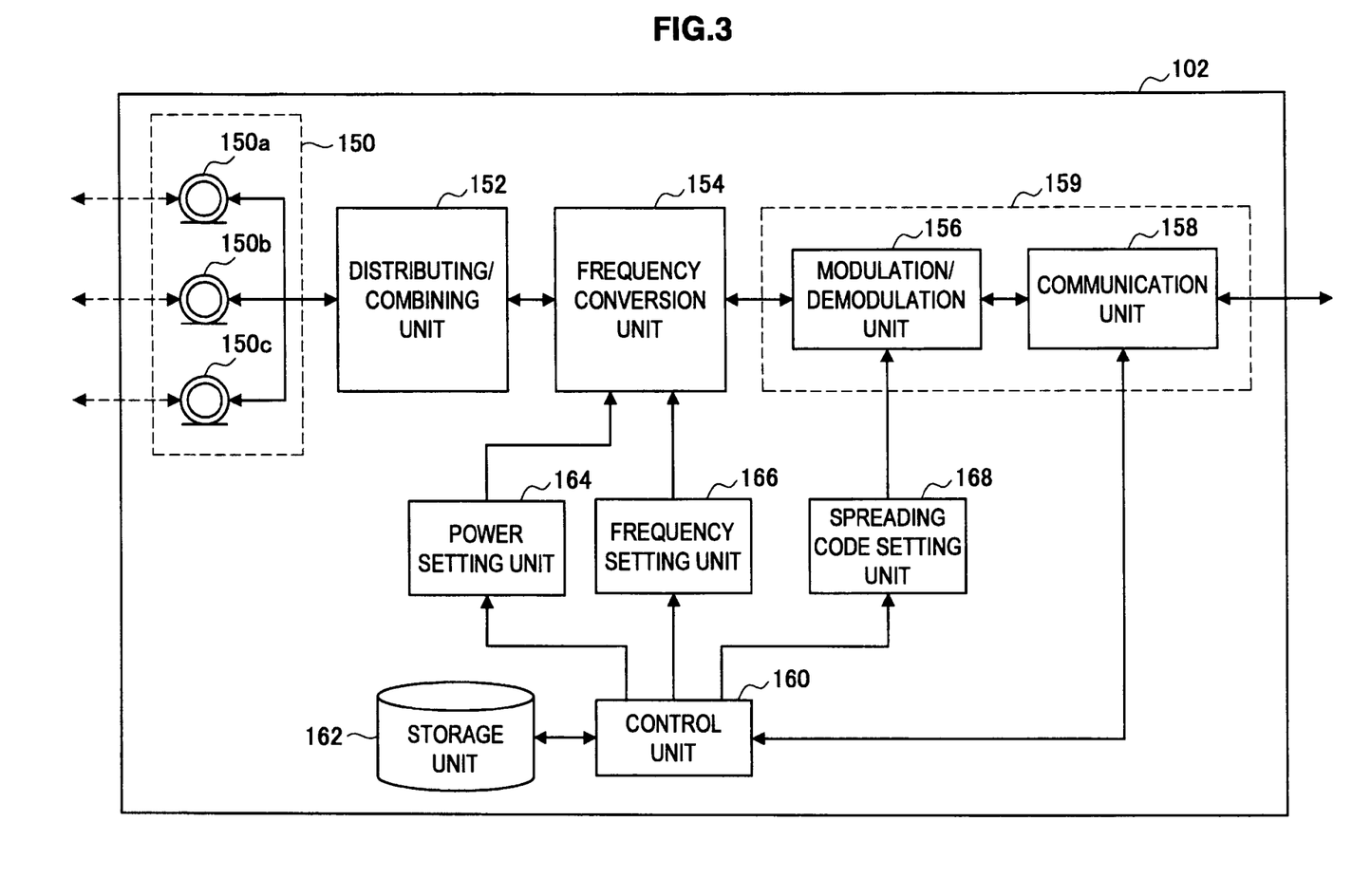
FIG. 3 is a block diagram showing a configuration of a communication control device according to an embodiment.

FIG. 3 is a block diagram showing an example of a configuration of the communication control device 102 according to an embodiment. Referring to FIG. 3, the communication control device 102 includes a wired connection unit 150, a distributing/combining unit 152, a frequency conversion unit 154, a protocol conversion unit 159, a control unit 160, a storage unit 162, a power setting unit 164, a frequency setting unit 166 and a spreading code setting unit 168. The protocol conversion unit 159 includes a modulation/demodulation unit 156 and a communication unit 158.

The wired connection unit 150 has at least one connector to which a cable such as a coaxial cable, for example, can be inserted. In the example of FIG. 3, three connectors 150a to 150c are shown. By connecting any one of the connectors 150a to 150c and the connector of the wired connection unit 130 of the cellular phone terminal 100 described above through a coaxial cable or the like, signals can be transmitted and received between the cellular phone terminal 100 and the communication control device 102 in a wired manner.

The distributing/combining unit 152, for example, performs power combining of signals transmitted from a plurality of cellular phone terminals 100 respectively connected to the connectors 150a to 150c of the wired connection unit 150 and outputs a combined signal to the frequency conversion unit 154. Further, the distributing/combining unit 152, for example, distributes a communication signal input from the frequency conversion unit 154 to cables connected to any of the connectors 150a to 150c of the wired connection unit 150. It should be noted that, in the case where the wired connection unit 150 has a single connector only, the distributing/combining unit 152 may be omitted.

The frequency conversion unit 154, for example, amplifies a communication signal having a specified transmitting frequency input from the distributing/combining unit 152, converts the frequency and outputs it to the modulation/demodulation unit 156. Further, the frequency conversion unit 154, for example, converts a frequency of a communication signal input from the modulation/demodulation unit 156 to a specified receiving frequency and outputs it to the distributing/combining unit 152. The transmitting frequency and the receiving frequency in the frequency conversion unit 154 are set in advance by the frequency setting unit 166, which is described later.

The modulation/demodulation unit 156, for example, demodulates a communication signal input from the frequency conversion unit 154 in compliance with the above-described mobile communication protocol and outputs it to the communication unit 158. Further, the modulation/demodulation unit 156, for example, modulates a signal input from the communication unit 158 in compliance with the above-described mobile communication protocol and outputs it to the frequency conversion unit 154. It should be noted that, in the case where the communication control device 102 communicates with the cellular phone terminal 100 in compliance with the W-CDMA standards, the modulation/demodulation unit 156 spreads/despreads a communication signal by using a spreading code which is common to the cellular phone terminal 100. The spreading code used for spread spectrum by the modulation/demodulation unit 156 is set in advance by the spreading code setting unit 168, which is described later.

The communication unit 158, for example, creates an IP packet that contains an audio signal or a data signal demodulated by the modulation/demodulation unit 156 and transmits it to the ISP network 20 through the home terminal 106 shown in FIG. 1. Further, the communication unit 158, for example, receives an IP packet through the home terminal 106, acquires an audio signal or a data signal whose destination is the cellular phone terminal 100 which is contained in the IP packet and outputs the acquired signal to the modulation/demodulation unit 156. By such processing of the modulation/demodulation unit 156 and the communication unit 158, protocol conversion between the mobile communication protocol such as W-CDMA and the IP is implemented.

The control unit 160 controls the above-described functions of the communication control device 102 as a whole by using a CPU, for example. The control unit 160, for example, can direct the cellular phone terminal 100 to set communication resources such as a transmitting power of a communication channel, a transmitting frequency and a receiving frequency or a spreading code based on control data stored in the storage unit 162 in a communication initiation sequence, which is described later, with the cellular phone terminal 100. Further, the control unit 160, for example, can perform mutual authentication for concealing the contents of communication with the cellular phone terminal 100. Furthermore, the control unit 160, for example, may transmit annunciation information containing information about the currently available transmitting frequency and receiving frequency to the cellular phone terminals 100 connected to the respective connectors 150a to 150c of the wired connection unit 150 at regular intervals.

The storage unit 162 stores the above-described control data to be used for control of communication with the cellular phone terminal 100 by using a storage device such as semiconductor memory or hard disk drive, for example. Further, the storage unit 162 may store subscriber information of the currently connected cellular phone terminal 100 with respect to each of the connectors 150a to 150c of the wired connection unit 150, for example. The control data is transmitted from the setting terminal 104 shown in FIG. 1 by way of illustration to the communication control device 102 and stored in the storage unit 162.

The power setting unit 164 sets the transmitting power of the frequency conversion unit 154 to a value indicated by the control data stored in the storage unit 162 in response to a direction from the control unit 160.

The frequency setting unit 166 sets the transmitting frequency and receiving frequency of the frequency conversion unit 154 to values indicated by the control data stored in the storage unit 162 in response to a direction from the control unit 160.

The spreading code setting unit 168 sets the spreading code of the modulation/demodulation unit 156 to a code stored in the storage unit 162 in response to a direction from the control unit 160. It should be noted that, in the case where the mobile communication protocol is a protocol with no need of spectrum spreading, the spreading code setting unit 168 may be eliminated from the configuration of the communication control device 102.

As a result of setting by the power setting unit 164, the frequency setting unit 166 and the spreading code setting unit 168 described above, the communication control device 102 can perform wired communication with the cellular phone terminal 100 by using the appropriate transmitting power, transmitting and receiving frequency and spreading code. Note that the control data stored in the storage unit 162 may be read from the storage unit 162 again upon startup of the communication control device 102, for example, and set by the respective units described above. This eliminates the need for a user to perform further setting after another power-on when power supply from the communication control device 102 is stopped.

The specific configurations of the cellular phone terminal 100 and the communication control device 102 are described above with reference to FIGS. 2 and 3. Hereinafter, communication control processing until the cellular phone terminal 100 initiates communication with another terminal device under control of the communication control device 102 is described.

<3. Flow of Communication Control Processing According to Embodiment>

Figure 4:
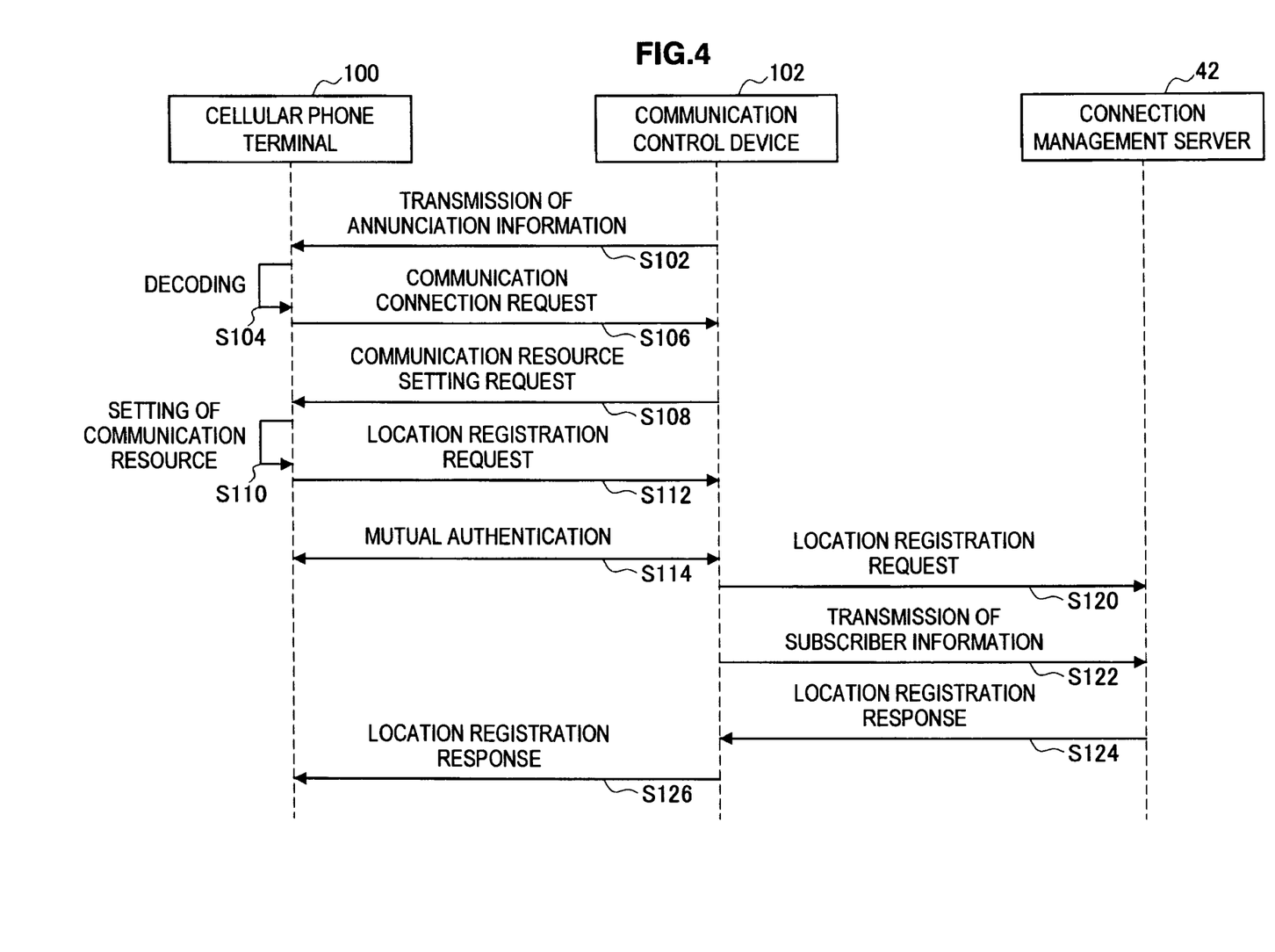
FIG. 4 is a sequence chart showing a flow of communication control processing up to initiation of communication according to an embodiment.

FIG. 4 is a sequence chart showing an example of a flow of communication control processing by the communication control device 102 until the cellular phone terminal 100 initiates communication with another terminal device. FIG. 4 shows processing of three devices, i.e. the cellular phone terminal 100, the communication control device 102 and the connection management server 42, which are involved in initiation of communication.

In FIG. 4, when the wired connection unit 130 of the cellular phone terminal 100 and the wired connection unit 150 of the communication control device 102 are connected by a coaxial cable or the like, annunciation information transmitted on a regular basis from the communication control device 102 is received by the cellular phone terminal 100 (S102). The annunciation information contains, for example, data related to a currently available channel among channels usable for wired communication in the communication control device 102 with the cellular phone terminal 100. For example, the annunciation information may contain data such as a transmitting frequency and a receiving frequency not in use, timing information when the cellular phone terminal 100 can transmit a communication connection request, a transmitting power or the like as the data related to a currently available channel.

Next, the cellular phone terminal 100 decodes the received annunciation information (S104). The cellular phone terminal 100 then transmits a communication connection request to the communication control device 102 according to the contents of the decoded annunciation information (S106). In response thereto, the communication control device 102 determines communication resources such as a transmitting power, a frequency or a spreading code to be allocated to the cellular phone terminal 100 from which the communication connection request is transmitted and transmits a communication resource setting request that requests setting of the determined communication resources to the cellular phone terminal 100 (S108). The cellular phone terminal 100 thereby makes setting of the communication resources designated in the communication resource setting request (S110).

After that, the cellular phone terminal 100 transits a location registration request for the connection management server 42 to the communication control device 102 in order to perform communication with another terminal device (S112). Then, mutual authentication for concealing the contents of communication is performed between the communication control device 102 and the cellular phone terminal 100 (S114). If the mutual authentication is successful, the communication control device 102 transmits the location registration request to the connection management server 42 (S120). The location registration request reaches the connection management server 42 via the ISP network 20, the Internet 30 and the core network 40 shown in FIG. 1, for example. Further, the communication control device 102 transmits subscriber information of the device for which location registration is requested to the connection management server 42 (S122). Then, the connection management server 42 registers the location information and subscriber information of the cellular phone terminal 100 onto a database and transmits a location registration response back to the communication control device 102 (S124). When the location registration response is received by the communication control device 102, the location registration response is relayed from the communication control device 102 to the cellular phone terminal 100 (S126).

After the above-described communication control processing, the cellular phone terminal 100 becomes able to communicate with another terminal device through a wired connection with the communication control device 102. Because radio signals are not sent out to the outer space when the cellular phone terminal 100 communicates with another terminal device through such a wired connection, interference with the existing communication service due to the indoor use of the cellular phone terminal 100 does not occur.

<4. Summary>

An embodiment of the present invention is described above with reference to FIGS. 1 to 4. According to the embodiment, communication with the core network 40 by the cellular phone terminal 100 is implemented as wired communication through the intermediation of the communication control device 102. Accordingly, communication using the cellular phone terminal 100 shown in FIG. 1, for example, can be performed at high speed through the IP network without any interference with communication by a base station or another terminal device. This enables high-speed communication by the cellular phone terminal 100 to be performed indoors without restraint with use of a sufficient transmitting power even in a metropolitan area where residences, office buildings and so on are densely packed, for example. Further, because it is not necessary for the communication control device 102 to incorporate the interference avoidance function such as monitoring the setting status of radio resources of nearby base stations, the communication control device 102 can be manufactured at lower costs compared to the indoor small base station.

It should be noted that a part or the whole of the communication control processing according to the embodiment described in this specification may be implemented by hardware or software. In the case of executing a series of or a part of processing by software, a program constituting the software is stored in a storage device such as ROM or hard disk drive, loaded to RAM upon execution and then executed by a CPU.

Although a preferred embodiment of the present invention is described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the case where the cellular phone terminal 100 supports one mobile communication protocol such as W-CDMA is described in this specification. However, the cellular phone terminal 100 may support two or more mobile communication protocols such as GSM and W-CDMA or W-CDMA and CDMA2000, for example and may be capable of a wired connection with the cellular phone terminals 100 that performs communication using those protocols.

Further, for example, it is not always necessary to perform the communication control processing described with reference to FIG. 4 according to the sequence shown in the flowchart. Each processing step may include processing performed in parallel or individually.

The present application contains subject matter related to that disclosed in Japanese Priority Patent Application JP 2009-015703 filed in the Japan Patent Office on Jan. 27, 2009, the entire content of which is hereby incorporated by reference.

What is claimed is:

1. A communication control device, comprising:
a wired connection unit configured to establish a wired connection with a mobile terminal;
a setting unit configured to determine one or more parameters for communications with the mobile terminal through the wired connection unit, the parameters comprising at least one of a transmitting frequency, a receiving frequency, a transmitting power, or a spreading code;
a modification unit configured to modify a communications signal transmitted to or received from the mobile terminal in accordance with the communications parameters; and
a protocol conversion unit configured to convert a protocol of the communication signal from a mobile communication protocol to an IP (Internet Protocol).

2. The communication control device according to claim 1, wherein the communication signal is a radio signal transmittable and receivable through an antenna by the mobile terminal.

3. The communication control device according to claim 2, wherein the mobile terminal is a cellular phone terminal.

4. The communication control device of claim 1, further comprising:
a storage unit that stores values of the communications parameters used for communication with the mobile terminal.

5. The communication control device according to claim 1, further comprising:
a control unit configured to transmit information related to an available frequency to a mobile terminal connected to the wired connection unit at regular intervals.

6. The communications control device of claim 1, wherein:
the setting unit is further configured to determine a transmitting frequency for communications with the mobile terminal through the wired connection; and
the modification unit is further configured to convert a frequency of the communications signal into the determined transmitting frequency.

7. The communications control device of claim 1, wherein:
the setting unit is further configured to determine a transmitting power for communications with the mobile terminal through the wired connection; and
the modification unit is further configured to modify the communications signal in accordance with the determined transmitting power.

8. The communications control device of claim 1, wherein:
the setting unit is further configured to determine a spreading code for communications with the mobile terminal through the wired connection; and
the modification unit is further configured to modulate or demodulate the communications signal in accordance with the determined spreading code.

9. The communications control device of claim 1, further comprising a control unit configured to transmit the modified communications signal to a connection server in accordance with the IP protocol, the connection server being configured to transmit the information associated with the modified communications signal to one or more additional mobile terminals.

10. The communications control device of claim 1, wherein the one or more communications parameters are associated with a mobile communications protocol.

11. A communication control method, comprising the steps of:
establishing a wired connection between a mobile terminal and a communication control device;
determining one or more parameters for communications between the mobile terminal and the communication control device across the wired connection;
modifying a communications signal transmitted to or received from the mobile terminal in accordance with the communications parameters;
converting a protocol of the communication signal received from the mobile terminal from a mobile communication protocol to an IP (Internet Protocol); and
transmitting the communication signal to a connection server within an IP network, in accordance with the IP protocol.

12. The method of claim 11, wherein the communication signal is a radio signal transmittable and receivable through an antenna by the mobile terminal.

13. The method of claim 12, wherein the mobile terminal is a cellular phone terminal.

14. The method of claim 11, further comprising transmitting information related to an available frequency to the mobile terminal at regular intervals.

15. The method of claim 11, wherein:
the determining comprises determining a transmitting frequency for communications between the mobile terminal and the communications control device; and
the modifying comprises converting a frequency of the communications signal into the determined transmitting frequency.

16. The method of claim 11, wherein:
the determining comprises determining a transmitting power for communications between the mobile terminal and the communications control device; and
the modifying comprises modifying the communications signal in accordance with the determined transmitting power.

17. The method of claim 11, wherein:
the determining comprises determining a spreading code for communications between the mobile terminal and the communications control device; and
the modifying comprises modulating or demodulating the communications signal in accordance with the determined spreading code.

18. The method of claim 11, wherein the one or more communications parameters are associated with a mobile communications protocol.

19. A tangible, non-transitory computer-readable medium storing instructions that, when executed by at least one processor, cause the processor to perform a method, comprising:
establishing a wired connection between a mobile terminal and a communications control device;
determining one or more parameters for communications between the mobile terminal and the communications control device through the wired connection;
modifying a communications signal transmitted to or received from the mobile terminal in accordance with the communications parameters;
converting a protocol of the communication signal from a mobile communication protocol to an IP (Internet Protocol); and
transmitting the communication signal across an IP network, in accordance with the IP protocol.

20. A communication system, comprising:
a mobile terminal including a radio communication unit configured to transmit or receive a communication signal in compliance with a mobile communication protocol; and
a communication control device including:
a wired connection unit configured to establish a wired connection with a mobile terminal;
a setting unit configured to determine one or more parameters for communications with the mobile terminal through the wired connection unit, the parameters com prising at least one of a transmitting frequency, a receiving frequency, a transmitting power, or a spreading code;

a modification unit configured to modify a communications signal transmitted to or received from the mobile terminal in accordance with the communications parameters; and a protocol conversion unit configured to convert a protocol of the modified communication signal from the mobile communication protocol to an IP (Internet Protocol).

* * * * *